United States Patent [19]

Sharangpani

[11] Patent Number: 5,590,359
[45] Date of Patent: Dec. 31, 1996

[54] METHOD AND APPARATUS FOR GENERATING A STATUS WORD IN A PIPELINED PROCESSOR

[75] Inventor: Harshvardhan P. Sharangpani, Santa Clara, Calif.

[73] Assignee: Intel Corporation, Santa Clara, Calif.

[21] Appl. No.: 313,728

[22] Filed: Sep. 27, 1994

Related U.S. Application Data

[63] Continuation of Ser. No. 925,984, Aug. 5, 1992, abandoned.

[51] Int. Cl.⁶ .................................................. G06F 9/00
[52] U.S. Cl. ................ 395/800; 395/569; 364/231.9; 364/262.4; 364/263.2; 364/DIG. 1
[58] Field of Search ....................................... 395/800, 375

[56] References Cited

U.S. PATENT DOCUMENTS

| | | | |
|---|---|---|---|
| 4,295,193 | 10/1981 | Pomerene | 395/375 |
| 4,903,264 | 2/1990 | Talgam et al. | 371/16.1 |
| 4,956,767 | 9/1990 | Stephenson | 395/500 |
| 5,134,693 | 7/1992 | Saini | 395/375 |

*Primary Examiner*—Alpesh M. Shah
*Attorney, Agent, or Firm*—Blakely, Sokoloff, Taylor & Zafman

[57] ABSTRACT

A method and apparatus for generating status information about a pipelined processor after the completion of an execution of an instruction. A first storage device stores the current overall status of the processor due to the execution of a plurality of instructions previous to the presently executing instruction. A second storage device stores an instruction status which represents the status of the processor due to the presently executing instruction alone. Logic generates a new overall status which represents the staus of the processor due to the execution of the present instruction and the previous instructions wherein the new overall status is generated from the instruction status and the current overall status.

20 Claims, 7 Drawing Sheets

Status Word

| | $B_{15}$ | $B_{14}$ | $B_{13}$ | $B_{12}$ | $B_{11}$ | $B_{10}$ | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|---|---|---|---|---|---|
| | B | C3 | T | O | S | C2 | C1 | C0 | ES | SF | PE | UE | OE | ZE | DE | IE |

| Machine Clocks | D$_2$ | E | X$_1$ | X$_2$ | WF | ER | |
|---|---|---|---|---|---|---|---|
| Clock 1 | μV$_{11}$ | | | | | | |
| Clock 2 | μV$_{21}$ | μV$_{11}$ | | | | | |
| Clock 3 | μV$_{31}$ | μV$_{21}$ | μV$_{11}$ | | | | |
| Clock 4 | μV$_{32}$ | μV$_{31}$ | μV$_{21}$ | μV$_{11}$ | | | |
| Clock 5 | | μV$_{32}$ | μV$_{31}$ | μV$_{21}$ | μV$_{11}$ | | |
| Clock 6 | | | μV$_{32}$ | μV$_{31}$ | μV$_{21}$ | μV$_{11}$ | ← Status Word 30 |
| Clock 7 | | | | μV$_{32}$ | μV$_{31}$ | μV$_{21}$ | ← Status Word 32 |
| Clock 8 | | | | | μV$_{32}$ | μV$_{31}$ | |
| Clock 9 | | | | | | μV$_{32}$ | ← Status Word 34 |

Pipeline Stage →

Figure 5

METHOD AND APPARATUS FOR GENERATING A STATUS WORD IN A PIPELINED PROCESSOR

This is a continuation of application Ser. No. 07/925,984, filed Aug. 5, 1992, now abandoned.

BACKGROUND OF THE INVENTION

1. Field of the Invention

This invention relates to the field of microprocessor design, and micro-architechure and more specifically to a method and apparatus for manipulating a Status Word register of an instruction set processor which has a pipelined execution unit.

2. PRIOR ART

One of the most popular math co-processor chips, the Intel 80387, implements the 80x87 instruction set. The x87 instruction set is a complex instruction set which provides a programmer with hardware support for a wide variety of numeric functions ranging from floating point adds and multiplies to transcendental functions. The x87 Instruction Set Architecture defines a status register which is updated after the execution of each numeric instruction, and which reflects the status of the machine at the completion of the instruction. The Status Word is "programmer visible" which means that after the execution of an instruction, a programmer can access each bit of the Status Word to determine the overall state of the floating point unit at any given point.

Detailed information with respect to x87 microprocessors and the x87 instruction set in general can be found in publications such as *Microprocessors* published by Intel Corporation and the 80386 *Microprocessor Handbook* published by McGrawHill.

As shown in FIG. 1, the Status Word is 16 bits wide and is broken up into several distinct components. Each component relays specific information about the status of the floating point unit after an execution of an instruction. The 16 bits of the Status Word contained in the Status Word register are updated after the completion of each instruction. In reference to FIG. 1, bits $B_0$–$B_5$ of the Status Word are known as the exception flags. These bits are flags for indicating when the floating point unit has detected an exception while executing an instruction. The six exceptions can be masked by masking bits corresponding to each exception found in the floating point unit control word.

$B_6$ of the Status Word is the stack flag (SF). This bit is used to distinguish invalid operations due to stack overflow or underflow. When $B_6$ (SF) is set, $B_9$ or (C1) distinguishes between stack overflow or underflow.

$B_7$ of the Status Word is known as the error summary bit (ES). The (ES) bit is set if an unmasked exception occurs, i.e., when any of bits $B_0$–$B_5$ of the Status Word are set, and the flagged exception is unmasked.

$B_{15}$ of the Status Word is known as the busy bit (B). The busy bit B is provided for compatibility with the 8087 instruction set and carries the same value as the (ES) bit, $B_7$ of the Status Word.

$B_{14}$ and $B_8$, $B_9$ and $B_{10}$ of the Status Word are the four numeric condition codes, C0–C3. Where $B_{14}$ corresponds to C3 and Bits 10, 9 and 8 correspond to C2-C0, respectively. Instructions which perform arithmetic operations update C0–C3 differently to reflect the outcome of each executed instruction. Each instruction updates C0–C3 in its own distinct manner. Instruction updating of C0–C3 is well defined and detailed in the handbook *Microprocessors* published by Intel Corporation.

Bits $B_{13}$, $B_{12}$ and $B_{11}$ are the top of stack bits (TOS). They provide three bits of data indicating which of eight floating point data registers supplied by x87 instruction set microprocessors is the current top of the stack.

PRIOR ART STATUS WORD GENERATION

Present math co-processor chips such as Intel's 8087, 80287, 80387 and microprocessors such as the i486 which implement the x87 instruction set are non-pipelined processors, that is, their execution units only operate on one instruction or microinstruction during each clock. Calculating and updating the Status Word for each executed instruction is relatively simple for these processors which have non-pipelined micro-architectures.

By way of example, FIG. 2 shows how an x87 instruction is broken up and executed in a non-pipelined architecture and how the Status Word is generated in the prior art. As shown in FIG. 2, an x87 instruction, instruction 1, is decoded into several microvectors. Each microvector provides control directives for the hardware of the execution unit. Each microvector is then serially executed by the processing unit. That is, one microvector enters the execution unit at a time, completely executes its directives, exits the unit, and then a second microvector may enter the execution unit. As shown in FIG. 2, the first microvector ($\mu v_1$) of the first instruction transfers the present Status Word contained in the Status Word (SW) register into a programmer invisible Temporary Status Word (TSW) register. The middle microvectors ($\mu v_2$–$\mu v_4$) of instruction 1 control hardware for executing the instruction. These microvectors also alter values of the Status Word stored in the temporary storage word (TSW) register in a pre-specified manner depending upon the specific instruction and its operands. Some, all, or none of the microvectors ($\mu v_2$–$\mu v_4$) change some, all, or none of the components of the Status Word stored in the TSW. The last microvector of instruction 1, $\mu v_5$, transfers the entire contents of the new Status Word in the TSW register back into the SW register. After completion of instruction 1, the SW register contains the new Status Word of the floating point unit after execution of instruction 1.

After completion of the floating point instruction 1, the first microvector ($\mu v_1$) of floating point instruction 2 is executed. This microvector $\mu v_1$ is used to transfer the present Status Word contained in the the SW register into the TSW register so that the Status Word may be updated during instruction 2. The subsequent microvectors of instruction 2 ($\mu v_2$–$\mu v_6$) operate on the Status Word contained in the TSW and alter or leave unchanged particular components of the Status Word depending upon the specific instruction and its particular operands.

During $mv_7$ of instruction 2, the new Status Word contained in the TSW is copied directly into the SW register. The Status Word after execution of $mv_7$ contains the combined status of the floating point unit due to executed instruction 1 and executed instruction 2. If instruction 2's microvectors ($mv_2$–$mv_6$) did not not alter any of the components of the Status Word while it was stored in the TSW register, then the SW register would still maintain the same Status Word that it had after instruction 1 was executed.

As can be seen, updating the SW register is easily accomplished in a non-pipelined architecture because the present contents of the SW register can be directly copied into the TSW register. The TSW register can then be operated on during the execution of the various microvectors which make up the executing instruction. When the last microvector of the instruction is complete, the contents of the TSW register can then be faithfully copied back into the SW register. At the completion of an instruction the SW register contains the updated Status Word of the Floating Point unit.

A problem with the prior art method of generating the Status Word is that it is incompatible with pipelined execution units. In order to facilitate greater program execution speeds, modern processors must utilize pipelined micro-architectures. FIG. 3 shows a pipelined execution scheme. Pipelining is a micro-architecture scheme whereby multiple instructions, or even microinstruction streams representing an instruction, are overlapped in execution at one time. The execution unit or pipeline, as shown in FIG. 3, is broken up into several individual stages. Each stage provides only partial execution of the instruction so that each stage takes only a fraction of the execution time necessary to execute an entire instruction.

As shown in FIG. 3, a first microvector µv1 representing a first instruction is provided to the execution unit during clock 1, where it begins its execution. At clock 2 the microvector µv1 journeys down to the next stage of the pipeline (stage 2) where it performs different aspects of its execution. Also at clock 2, microvector µv2 representing a second different instruction begins its execution in the first stage of the pipeline. Instructions continue to proceed to subsequent pipeline stages and enter the pipeline during each new clock signal. At clock 4 microvector µv1 reaches the last stage of the pipeline, stage 4, and completes its execution. It is at this time that the results of the executed instruction µv1 are available and can be written into various programmer visible registers of the processor. It is noted that the results from microvector µv1 are not available until the completion of clock 4 so that instruction 2, (comprising solely of µv2), and instruction 3 (comprising two microvectors µv31 and µv32) enter the instruction pipeline without knowledge of the results of instruction 1.

As is evident, an instruction still requires several clocks, like an instruction in a non-pipelined machine, to complete its execution. Instruction throughput, however, is dramatically increased because new instructions complete execution nearly every clock. That is, on a pipelined machine, an instruction is completed nearly every machine cycle, whereas in a non-pipelined machine, instruction throughput is equivalent to instruction execution time. Pipelined micro-architectures may easily have an instruction throughput rate on the order of three to five times that of non-pipeline micro-architectures.

Unfortunately, the prior method of updating the Status Word in the Status Word register on a per instruction basis is incompatible with the efficiently pipelined machine shown in FIG. 3. This is because the prior art method requires knowledge of the status of earlier instructions before instruction execution can begin. For example, FIG. 4 shows the prior art method of updating the Status Word implemented in a pipeline micro-architecture. In FIG. 4, instruction 1 µv1 enters the pipeline at clock 1 and completes its execution in stage 4 at clock 4. It is not until clock 4 that instruction 1, µv1, is able to provide results from its execution. If the prior art method was used for updating the Status Word, the Status Word at the start of Clock 5 would be copied from the Status Word register to the Temporary Status Word register so that the second instruction µv2 could operate on it during its execution. The second instruction would execute during clocks 5, 6, & 7 and at the same time update the Status Word contained in the Temporary Status Word. At clock 8 when instruction 2 finally completes its execution, the new Status Word contained in the Temporary Status Word would simply be copied back into the Status Word register. At clock 9 the Status Word contained in the Status Word register would once again be copied directly into the Temporary Status Word register, so that instruction 3, µv3, could begin its execution.

A problem with the prior art method of generating the Status Word in a pipelined execution unit is evident in FIG. 4. Instruction 2, µv2, and Instruction 3, µv3, must both stall in the execution pipeline in order to wait for the status of the previously executed instruction (instructions 1 and 2, respectively). Instructions 2 and 3 must stall in order to wait for the previous instructions 1 and 2, respectively, to provide results to the Status Word register, so that these results can be copied into the TSW register where they can be updated. Since instructions are forced to wait for the updating of the TSW register the advantages in pipelining the execution unit are lost because of the prior art technique of updating the Status Word. The prior art status generation technique reduces the instruction throughout of a pipelined micro-architecture to that of a non-pipelined micro-architecture.

Thus, what is needed is a method and apparatus for generating on a per instruction basis, an updated Status Word of a microprocessor having a pipelined execution unit, wherein the advantages of pipelined execution unit are not lost by the status generation method.

SUMMARY OF THE INVENTION

A method and apparatus for generating on a per instruction basis the Status Word of an x87 instruction set compatible processor which has a pipelined floating point unit.

Instructions are decoded into a stream of microvectors wherein the stream of microvectors has a first microvector representing the start of the instruction and a last microvector representing the end of the instruction. Each individual microvector of an instruction comprises a plurality of control fields which provide control directives for updating the status information of the processor and for executing various operations of the instruction.

SW storage means is provided in the last stage of the pipeline for each component of the x87 Status Word. The SW storage means stores the x87 Status Word which indicates the overall status of the floating point unit due to all instructions which have completed execution in the floating point unit.

TSW storage means is provided in the second to last stage of the pipeline. The TSW storage means stores and accumulates the status information of individual microvectors of an instruction. When the last microvector of an instruction reaches the second to last stage of the pipeline the TSW storage means contains the accumulated status of individual microvectors of a microvector stream which make up an instruction. At this time the accumulated status in the TSW storage means provides the status of the floating point unit due to the execution of a single instruction alone.

Valid bits are provided with those components of TSW storage means which may at times contain invalid data. A set valid bit indicates that the associated TSW storage means contains valid data.

In a stage before the read operand stage, the TOS value of the Status Word is calculated. The TOS value is staged down, along with the microvector which generated it, into the TOS component of the TSW storage means. When a first microvector of an instruction reaches the second to last stage of the pipeline, all components of the TSW storage means, except for the TOS storage means, are cleared and updated with status data due to the first microvector alone. As subsequent microvectors of an instruction enter the second to last stage of the pipeline they update the status data contained in the TSW storage means in their own specific manner.

When the last microvector of an instruction reaches the last stage of the pipeline, a new Status Word is generated by merging the current Status Word presently stored in the SW storage mean with the accumulated status of individual microvectors of a single instruction stored in the TSW register. The new Status Word provides the overall status of the floating point unit after completion of the most recent instruction through the execution unit as well as the status of the floating point unit due to previously executed instructions.

A goal of the present invention is to consistently and accurately provide a user visible Status Word after the completion of each instruction through a pipelined execution unit.

Another goal of the present unit is to provide a Status Word for a pipelined execution unit without having to stall subsequent instructions in the pipeline in order the generate the Status Word.

BRIEF DESCRIPTION OF THE DRAWINGS

FIG. 5 shows the pipelined execution unit of the present invention.

DETAILED DESCRIPTION OF THE PRESENT INVENTION

The present invention discloses a novel method of updating a Status register which provides the overall status of a processor having a pipelined micro-architecture. In the following description, numerous specific details are set forth in order to provide a thorough understanding of the present invention. However, it will be obvious to one skilled in the art that the present invention may be practiced without these specific details. In other instances, well-known processor architecture concepts have not been set forth in detail in order to not unnecessarily obscure the present invention.

Figures 1, 2:
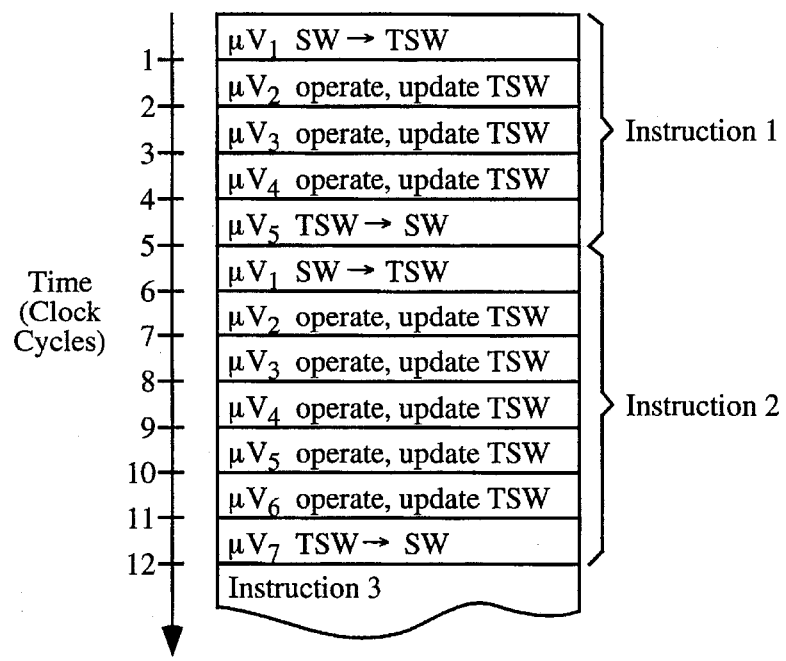
FIG. 1 is the 16 bit Status Word of an x87 instruction set processor broken up into individual components.
FIG. 2 is the prior method of updating the Status Word on a per instruction basis.
Figure 3:
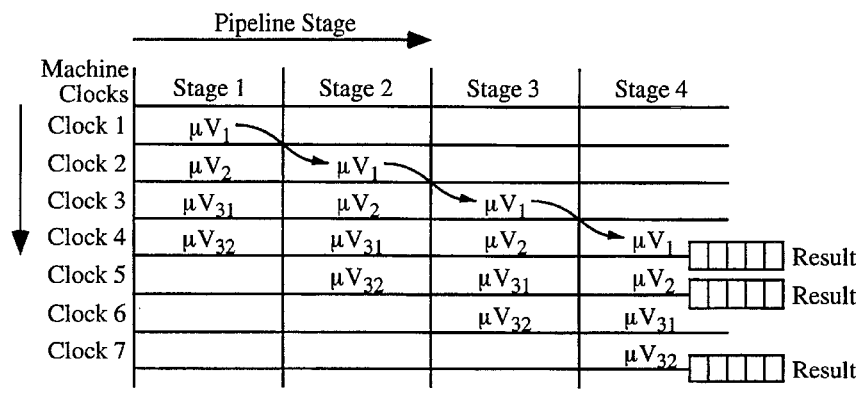
FIG. 3 shows how instruction execution can be pipelined.
Figure 4:
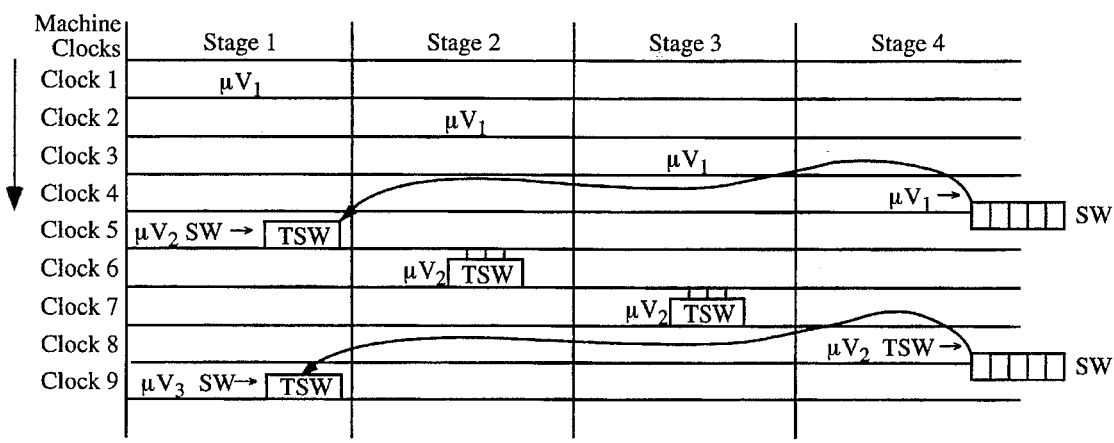
FIG. 4 shows the prior art method of updating the Status Word implemented in a pipelined execution unit.

In reference to FIG. 1, the present invention is a method and apparatus for generating a Status Word for each instruction executed by a pipelined floating point unit. The Status Word is found in the Status Word (SW) register, a 16-bit programmer visible register provided by the Intel x87 instruction set. The Status Word reflects the overall state of the floating point unit after each instruction execution. The Status Word is broken into several different and complete components each relaying specific information about the overall status of the floating point unit after the complete execution of each instruction. It is essential for x87 instruction set processors to provide an updated Status Word to the Status Word register at the completion of each instruction execution. Each instruction manipulates the Status Word in its own particular way. Some instructions update or change each component of the Status Word. Other instructions only manipulate certain components of the Status Word and leave the other components unchanged. Still other instructions do not alter the Status Word at all.

OVERVIEW OF PRESENT INVENTION

In the microprocessor in which the present invention is implemented, each instruction is decoded into a microvector or into a stream of microvectors. The present invention is implemented in a floating point unit wherein the microvector execution is pipelined. Such pipelining significantly increases instruction execution throughput over that of non-pipelined micro-architectures. In pipelined micro-architectures, the execution of a microvector is implemented in several stages. For example, in the present invention, the pipeline is broken up into at eight stages: a prefetch stage (PF), a first decode and micro instruction vector issue stage (D1), a second decode stage (D2), a memory and register file read stage (E), a first execute stage (X1), a second execute stage (X2), a rounding and floating point write stage (WF), and an internal special situation report stage (ER). Only the last five stages, D2, E, X1, X2, WF and ER of the execution pipeline are relevant to the present invention.

FIG. 5 is a graphical representation of the pipelined floating point unit in which the present invention is implemented. By way of example, we show what the method and apparatus of the present invention accomplish. An instruction 1 is converted into a single microvector, μv11. On the beginning of clock 1 μv11 moves into the D2 stage of the instruction execution pipeline where the information carried in its various control fields provides input signals to the logic of the D2 stage. At the beginning of clock 2, μv11 moves into the E stage of the instruction pipeline where again, various components or directives of microvector μv11 cause the processor hardware in E to implement various functions. Additionally, on the rising edge of clock 2, as microvector μv11 moves to the E stage, microvector μv21 moves into the D2 stage of the pipeline. On clock 3, both μv11 and μv21 move to subsequent stages of the pipeline, X1 and E, respectively, where they further affect their operations. Also, on clock 3, microvector μv31, which is the first vector of two microvectors which make up the third instruction, enters D2 to begin its execution. On clock 4, each of the microvectors, μv11, μv21 and μv31 moves to the next stage of the pipeline, and the second microvector μv32 of the third instruction enters the execution pipeline at D2. Vectors continue to enter the pipeline and proceed through the pipeline in the manner shown in FIG. 5.

Eventually, on the sixth clock, microvector μv11 representing instruction 1 enters the last stage of the instruction pipeline, the ER stage, or error reporting stage. The Status Word register at this point is updated with a Status Word 30 specifying the status of the floating point unit after completion of the first instruction. At the end of the seventh clock, the second microvector in the pipeline μv21, representing the second instruction, completes the execution pipeline and the Status Word register is once again updated with a new Status Word 32 which represents the new status of FPU after microvector µv21. It is important to note that µv21 may have changed all, none, or some of the components of Status Word 30. That is, instruction 2 only updates those components of the Status Word 30 which it has affected. Thus, the Status Word register contains a Status Word 32 with may have some components set by instruction 2, and some components set by instruction 1. It is in this manner that the Status Word 32 describes the overall status of the floating point unit.

On the completion of clock 8, microvector µv31 completes the ER stage. However, because µv31 is only the first microvector of two microvectors which makes up instruction 3, the Status Word register still contains the Status Word 32. That is, the contents of the Status Word register are still the same as they were after the completion of clock 7. At the completion of clock 9, microvector µv32 has completed the instruction pipeline, and thus, so has instruction 3. At the end of clock 9, the Status Word register is updated with the Status Word 34, which provides the overall status of the execution unit. All, none, or some of the components of Status Word 32 may have been changed to form Status Word 34.

Thus, the present invention provides a method and apparatus for updating the Status Word after the completion of each instruction where instruction execution is implemented with a pipelined micro-architecture. The method and apparatus of the present invention also allows for instructions to be represented with a single microvector or with a plurality of microvectors. The method and apparatus of the present invention faithfully provide an updated Status Word as each instruction completes the execution pipeline. The present invention does not require an instruction to stall in order to provide an updated Status Word.

Figure 6:
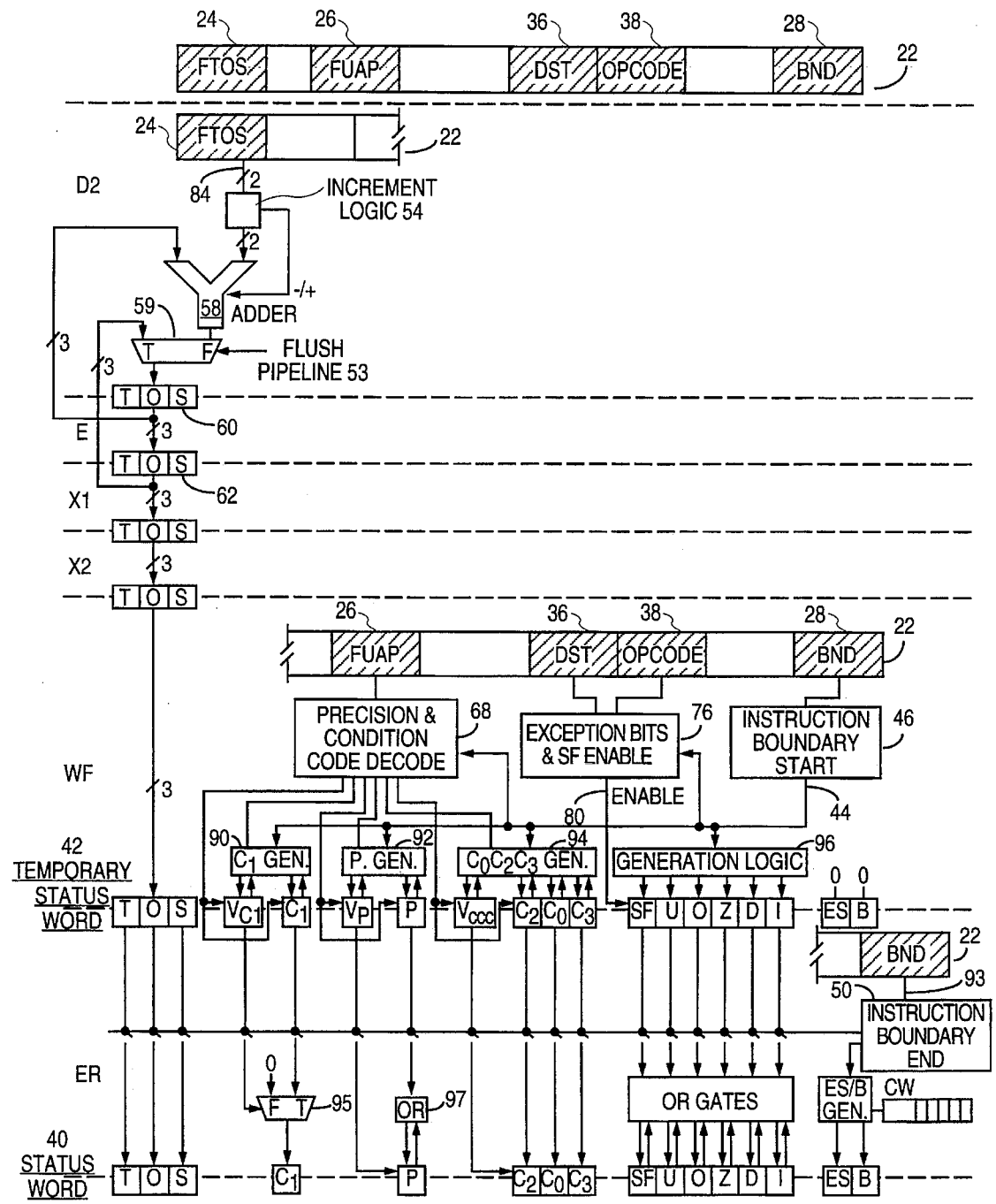
FIG. 6 is a apparatus of the present invention for updating the Status Word in a processor having a pipelined execution unit.

The preferred method of generating the Status Word on a per instruction basis is graphically shown in FIG. 6. In FIG. 6, the relevant stages of the floating point unit pipeline (D2, E, X1, X2, WF and ER) are shown in a downward direction. Each stage of the FPU pipeline requires one clock cycle for execution. Before entering the D2 stage, each instruction is pre-fetched and decoded into a single 90-bit microvector 22 for simple instructions and sometimes into a plurality of 90-bit microvectors, 22, for more complex instructions. (Some complex instructions such as transcendentals are decoded into over a hundred microvectors.) A microvector progresses down to a new pipeline stage each clock cycle. Each microvector 22 is divided into several fields which provide microcontrol directives. Each field provides specific control information specific to the instruction being executed for the hardware contained in each pipeline stage. The fields contained in microvector 22 which are relevant to status generation are: FTOS, 24, a dedicated two bit field for manipulating the top of the stack, FUAP, 26 a dedicated two bit control field for updating condition code bits and the precision bit, Opcode and dst fields 38 and 36 respectively for updating the exception bits, and the SF bit, and a BND field 28 for boundary signalling.

The Status Word register, 40, is shown at the end of the ER stage. The Status Word register 40 is shown broken up into individual registers: SW.TOS, SW.C1, SW.P, SW.C2, SW.C0, SW.C3, SW.SF, SW.U, SW.O, SW.Z SW.D, SW.I, SW.ES and SW.B. There is an individual register in the Status Word register for each bit of the Status Word. Each individual register of the Status Word 40 can be written into directly and read from directly. The Status Word register 40 is made up of clock triggered flip-flops. The Status Word register 40 provides a Status Word at the completion of each instruction through the pipeline. The Status Word contained in the Status Word register 40 represents the overall status of the processor at the completion of an instruction.

A Temporary Status Word register 42 is shown at the end of the WF stage. Like the Status Word register 40, the Temporary Status Word register 42 is divided up into several individual registers:TSW.TOS, TSW.C1, TSW.P, TSW.C2, TSW.C0, TSW.C3, TSW.SF, TSW.U, TSW.O, TSW.Z, TSW.D, TSW.I, TSW.ES and TSW.B Each of the registers, as with all registers of the present invention, are clock triggered flip-flops. Also provided with the condition code registers TSW.C1, TSW.C3, TSW.C0, and TSW.C2 and the precision register TSW.P of the Temporary Status Word register are valid bits $V_{C1}$, $V_{CCC}$, and $V_P$, respectively. The valid bits indicate when their respective components of the Temporary Status Word contain valid data. The Temporary Status Word (TSW), register 42 acts as an accumulator to accumulate the status of a stream of microvectors which combine to constitute a single instruction. The TSW register, 42, holds a Temporary Status Word which is the status corresponding to a single instruction and not the overall Status Word of the execution unit.

The Temporary Status Word 42 stores a Temporary Status Word which specifies the status of the processor due to a single instruction. Because a single instruction can be represented by a plurality of individual microvectors, hence in any microvector stream, the Temporary Status Word must be able to accumulate the status due to the individual microvectors which make up the instruction. It is therefore important to be able to determine a the boundaries of an instruction. That is, one must be able to determine a "start boundary" or the first microvector in a stream of microvectors representing an instruction, and one must be able to determine an "end boundary" or the last microvector in a stream of microvectors. In the present invention the BND field 28 of each microvector specifies whether the microvector is the first or last microvector. Additionally, simple instructions which are represented by a single microvector signal both first and last microvector conditions.

As shown in FIG. 6, status generation begins when microvectors enter the D2 stage of the execution pipeline. In the D2 stage of the pipeline the TOS component of the Temporary Status Word is computed under control of the FTOS field 24 of the microvector. As the microvector proceeds to subsequent stages of the pipeline, it carries out various operations and "stages down" with it the computed TOS value. When the microvector finally reaches the WF stage of the pipeline, the instruction boundary start logic 46 reads the boundary field, BND 28, to determine if this microvector is the first or only vector representing an instruction. If the microvector is the first microvector of a microvector stream or is a single microvector representing an instruction it provides a start of boundary signal on line 44 to status generators 90, 92, 94, and 96. This signal essentially clears all components of the Temporary Status Word (TSW) register 42 except the TOS component, so that the first microvector can update the Temporary Status Word with information that corresponds to the first microvector alone. If the microvector is the first microvector of a stream of microvectors representing an instruction, subsequent microvectors update components of the Temporary Status Word in their own manner. The Temporary Status Word register accumulates the status of the processor for a stream of microvectors representing a single instruction. In this way, only status data defined by the present instruction is contained in the Temporary Status Word register.

As microvectors enter the last stage of the pipeline, the ER stage, the BND field of the microvector is checked by instruction boundary end logic 50. If the microvector is the last microvector of a microvector stream representing an instruction or is the only microvector representing the instruction, the Temporary Status Word contained in the TSW register 42 is "rolled over" to the SW register. It is important to note that in the present invention the contents of the TSW register 42 are not simply copied into the Status Word register 40 as in the prior art technique, but are "rolled over", or merged, with the present contents of the Status Word 40. A simple copy from the TSW 42 to the SW 40 cannot be used, as in the prior art technique, because the TSW register 42 of the present invention contains only the status of the execution unit due to one instruction and not the overall status due to a plurality of instructions.

In the ER stage of the pipeline the new Status Word is generated by merging the current Status Word found in Status Word register 40 with the status data from the presently executing instruction found in the TSW register 42. It is in this way that the Status Word register 42 is updated at the completion of each instruction through the ER stage with a new Status Word which represents the overall status of the processing unit after completion of the instruction. It is very important to note that only those components of the Status Word which need to be updated are changed and the remaining stay unaltered or in the state they were in at the completion of the preceding instruction.

We will now describe in detail the method in which each component of the Status Word is generated from microvectors.

THE TOS FIELD

The TOS component of the Status Word is a three bit field which is the address of one of the eight x87 floating point data registers which is currently the top of the stack (TOS). In the x87 instruction set architecture, the data registers are organized as a stack. Data register accesses are made by reference to the current top of stack register. For example, a "load" operation loads a value from memory into the new TOS register and decrements the TOS register value (the stack grows downward). The TOS component of the Status Word provides the address of the data register which is at the top of stack at the completion of an instruction through the pipeline.

Status generation begins when a microvector is provided to the D2 stage of the pipeline. At the D2/E boundary of the pipeline is a 3-bit register called TOS.D2/E 60. This register contains one of eight register addresses which is the top of the stack at the beginning of the execution of microvector 22 in the $D_2$ stage of the pipeline. A 2-bit control directive of microvector 22, FTOS 24, dictates whether the present TOS value should be incremented by 1, incremented by 2, stay the same, or decremented by 1. This information is provided by signal line 84 to increment control logic 54 which provides either a "1", a "0", or a "2" to the 2-bit input of the adder 56. The increment control logic 54 also provides an addition or subtraction signal to the adder depending upon whether the top of stack is being incremented or decremented. The present TOS value stored in the TOS.D2/E register is provided to the 3-bit input of adder 58. Adder 58 generates a new TOS value by incrementing/decrementing the present TOS value presently stored in the TOS.D2/E register.

The output of adder 56, the TOS value, is provided to one input of 2:1 MUX 59. The second input is the TOS.E/X1 register. The MUX provides a means for resetting the present TOS value in the TOS.D2/E stage to the value in the TOS E/X1 register, if an error or flush occurs. If an error, such as stack underflow, occurs in the E stage or an earlier stage of the execution pipeline, the pipeline is flushed, and all operations occurring prior to the E stage are cleared from the pipeline. If a "true" flush signal 53 is provided to the 2:1 MUX 59, the TOS value stored in the TOS. E/X1 register is copied to the TOS.D2/E register 60. Since any microvector which completes the E stage will exit the pipeline without being flushed, information stored in the TOS.E/X 1 register 62 is always valid data. In this way, if a flush occurs, the TOS value from the last microvector guaranteed to clear the pipeline is placed back into the TOS.D2/E register. If no flush occurs, the new TOS value generated by adder 58 is provided to the TOS.D2/E register.

After the advance of a microvector out of the D2 stage the TOS.D2/E register 60 contains the address of the register which is currently the top of stack. During the next clock cycle, the content of the TOS.D2/E register 60 is "staged down" through the E stage by providing a TOS.E/X1 62 register where the TOS value can be faithfully copied. Thus, the TOS value for microvector 22 is staged down through the pipeline along with microvector 22. When microvector 22 reaches the WF stage the TOS value corresponding to μv22 is supplied to the TOS component of the Temporary Status Word register 42 (TSW.TOS). The location of the top of stack is kept in the TSW.TOS register until an "end boundary" (last microvector) is sensed by instruction boundary end logic 50. When an "end boundary" is sensed, the value of TSW.TOS is copied directly into the TOS component of Status Word 40 or SW.TOS. If an "end boundary" is not sensed, then there is no "rollover" and the top of stack location of subsequent microvectors is staged down into the TSW.TOS register. The TSW.TOS register accumulates the top of stack location until an end of boundary condition is finally sensed. At the completion of an instruction through the ER stage, the data contained in SW.TOS corresponds to the floating point data register which is currently the top of stack after the completion of the instruction.

It should be evident that the TOS calculation can be implemented in any one of several pipeline stages and staged down from there. In the current invention, the top of stack is calculated early in the D2 stage. The top of stack is calculated here because the next stage of the pipeline, the E stage, reads operands for the instruction. Since operands for an instruction are read from the floating point data registers, which are accessed with respect to top of stack, the current top of stack must be updated for the next incoming microvector so that it can locate its operands. The top of stack calculation, therefore, must either reside in a stage before the read operand stage or at worst reside in the same stage. In the present invention, the top of stack calculation resides in the D2 stage which precedes the read operand stage, or the E stage.

CONDITION CODE AND PRECISION BIT

The four numeric condition code bits, C3, C2, C1 and CO are provided to reflect the outcome of arithmetic operations. The effect of x87 instructions upon these bits are well-known in the art and are well documented. The effects can be found in product-line handbooks such as *Microprocessors*, published by Intel Corporation. Among other things, the condition codes provide the results of comparisons. The precision bit PE, or B5, of the Status Word indicates whether an approximation was incurred during the computation. The C1 bit often indicates whether the last rounding of the significand was upward. As with the other components of the Status Word, the precision bit P and condition code bits C0, C1, C2, C3 are each affected differently by each instruction.

In reference to FIG. 6, the setting and updating of these components takes place in the WF stage of the execution pipeline because rounding occurs in the WF, and hence, C1 and P lie in the WF stage. Additionally, the comparisons greater than, less than, and equal to, are completed in the WF stage, and thus, it is logical to update the condition code bits representing the results of these comparisons in the same stage.

In reference to FIG. 6, microvector 22 has a specially dedicated control field called FUAP 26 to control the setting of the valid bits $V_{C1}$, $V_p$, $V_{CCC}$ and update of the condition bits, C3-C0, and the precision bit. The control field FUAP 26 is a dedicated 2-bit control field which provides one of four possible control directives. The sole function of the dedicated FUAP field 26 is to control the updating of the condition code bits and precision bit and to set the associated valid bits. A 2-bit field is all that is necessary to control the updating and setting of the condition bits and the precision because of the unique grouping of the components. It has been discovered that there are only four different permutations in which the updating of P, C1, C3, C2 and C0 occurs. In the first permutation, none of the values of P, C1, C2, C3 and C0 are updated. In the second permutation, all of the bits, P, C1, C3, C2, C0 are updated. In the third permutation only the P-bit and the C1-bit are updated and the C3, C2 and C0 bits are unaltered. In the fourth permutation, the condition code bits C3, C2, C0 and C1 are updated and the precision bit P is unaltered. Thus, because it has been discovered that only four different update scenarios exist, only 2-bits of control data are necessary to control the updating of the P, C3, C2, C0 and C1 bits of the Status Word. Using only a 2-bit field in microvector 22 saves an already limited silicon area by requiring fewer bus lines and fewer CROM memory locations where instruction microvectors are stored.

When microvector 22 reaches the WF stage of the pipeline, the FUAP field 26 is read by precision and condition decode logic 68 to determine which of the four update permutations is going to take place. Additionally, the BND field is checked by logic 46 to determine if the microvector is the first microvector of an instruction (i.e. is a single microvector solely comprising an instruction or the first microvector of a stream of microvectors comprising an instruction). This information is provided to C1 generator logic 90, to P generator logic 92 and to C0, C2, C3 generator logic 94.

Figure 7:
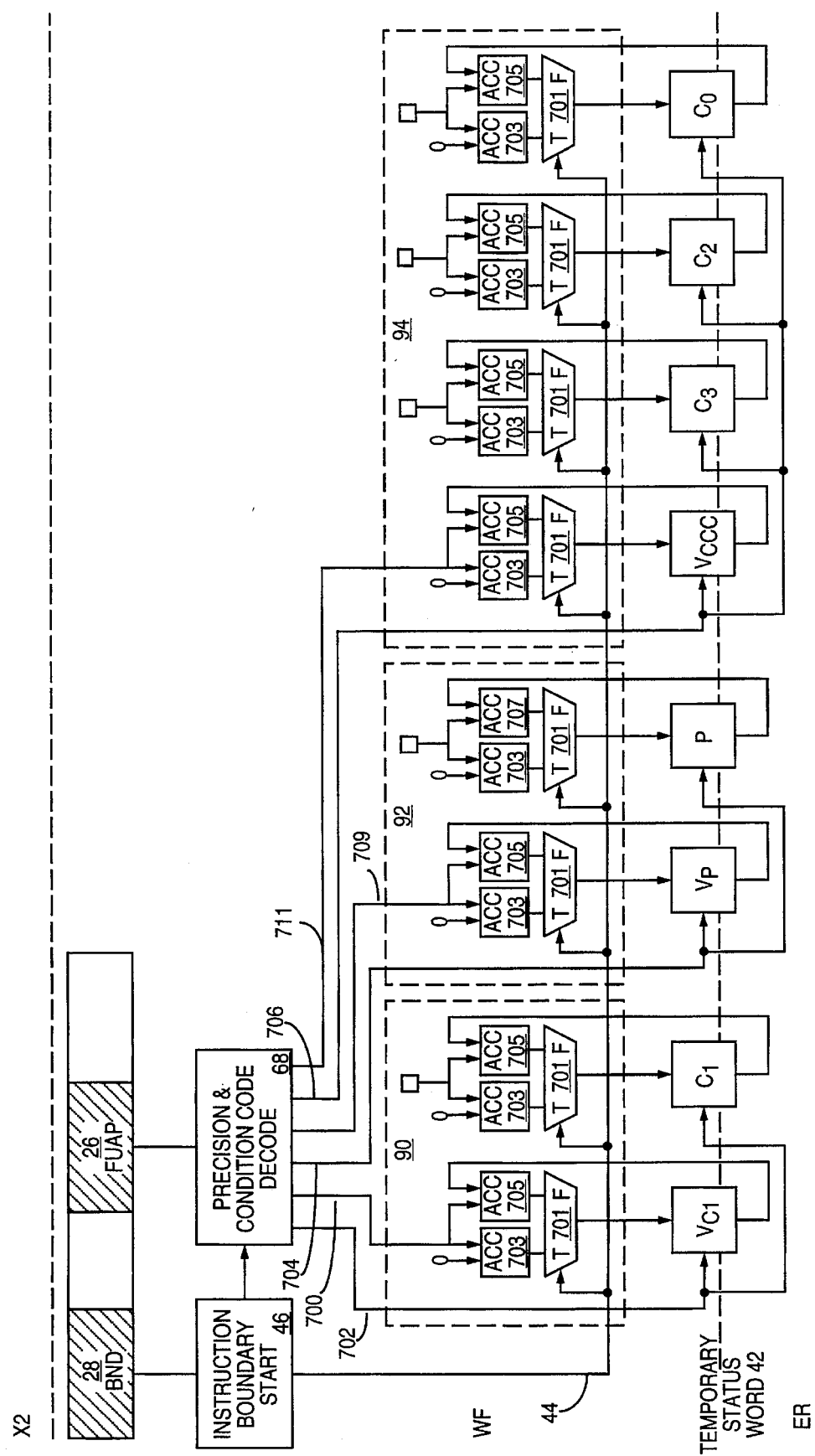
FIG. 7 shows apparatuses for generating the C1, P, C0, C2, and C3 status bits of an instruction.

The C1 generator logic 90, the P generator logic 92, and the C0, C2, C3 generator logic 94 are each essentially the same and are shown generally in FIG. 7. The function of each generator logic is to provide updated values for the Temporary Status Word. Additionally, logic is able to clear the TSW register on a first microvector and with the same microvector is able to update the TSW register if need be with fresh information from this first microvector. Provided for each component of the Temporary Status Word TSW.C1, TSW.P and TSW.C0, C2, C3 and their respective valid bits VC1, VP and VCCC, respectively is a 2:1 multiplexer or MUX 701. The "start boundary" signal 44 selects one of two input signals. The first input signal (true) is chosen if the microvector is the first microvector of a stream or is a single microvector. The second input signal (false) is chosen for all other situations. If the true signal is chosen the C1, P, C0, C2, and C3 components of the Temporary Status Word and their respective valid bits are, in essence, first cleared and then set to the value corresponding to the first microvector of the new instruction.

As shown in FIG. 7, the true input to each of the 2:1 MUX 701 is coupled to an accumulator 703. Each accumulator 703 is provided a "zero" and a new value. The new values for the valid bits come from the precision and condition code decode logic 68 on signal lines 700, 709, and 711 and are a "one" if the respective component of the Temporary Status Word is updated. The new values for components of the Temporary Status Word components are generated by logic in the WF stage. The accumulator 703 for each of the true inputs acts as an overwrite. The overwrite function of accumulator 703 allows the zero input to be overwritten by the new input. In this way, a first microvector will either set the TSW.C0, TSW.C1, TSW.C2, TSW.C3 and TSW.P registers to all zeros if the first microvector does not update the components, or will set the TSW register to new values generated by the first microvector alone.

The false signals of the 2:1 MUX 701 are generated from a second accumulator 705. The second accumulator 705 receives the new value at one input and the present value of the Temporary Status Word at the other. For the valid bits and condition code bits of the Temporary Status Word, the accumulator 705, provides an overwrite function. That is, the accumulator 705 overwrites the present value with a new value. The accumulator 707 for the precision bit P however provides an "or" function as opposed to an overwrite function.

If a specific microvector is going to update the TSW.P TSW.C1, TSW.C0, TSW.C2, TSW.C3 registers then precision and condition code decode logic 68 provides, according to the update scheme specified by the FUAP field, enable signals on lines 702, 704, 706 for those components and their respective valid bits which are to be updated. It is to be appreciated that new C0, C1, C2, C3, and P values are provided in the generator logic 90, 92, 94 by the WF hardware during each clock cycle regardless of whether or not an update is going to occur. Therefore enable signals are used to prevent the registers from becoming updated or written into at unspecified times. Valid bits are used with the TSW.P, TSW.C0, TSW.C2, TSW.C3 registers of the temporary status word because these registers may at times contain invalid data. A set valid bit indicates that the related register contains valid data.

In the present invention, the Temporary Status Word register TSW 42 acts as an accumulator. When microvector 22 enters the ER stage of the pipeline, if an "end boundary" condition is not sensed then the values contained in TSW.C3, C2, C0, C1 and P are not "rolled-over" to their respective Status Word register components 40, but instead remain in the Temporary Status Word register 42. The next microvector of the instruction then updates components of the Temporary Status Word register 42 in its own manner. The Temporary Status Word register 42 accumulates the status of individual microvectors when instructions are represented by a stream of microvectors. In this way TSW.P, TSW.C3, TSW.C2, TSW.C1 and TSW.C0 provide the condition code and precision bit status of the floating point unit due to the executed instruction.

When the execution of a stream of microvectors representing an instruction has completed and an "end boundary" condition is finally sensed, the data in registers TSW.P, TSW.C0, TSW.C1, TSW.C2, and TSW.C3 is then "rolled over" into their respective SW registers 40. When "rollover" does occur, only those components of the TSW registers 42 which have their valid bits set are rolled over into their respective components of the Status Word register 40. Data contained in TSW.C0, TSW.C1, TSW.C2, TSW.C3 and TSW.P is only assumed valid when the respective valid bit is set. If the $V_{CCC}$ valid bit is set the C0, C2, and C3 bits of the TSW register are copied directly into their respective SW registers. If the valid bit $V_{CCC}$ is not set the C0, C2, and C3 bits of the SW register remain unaltered from the previous instruction. If the valid bit Vp is set the content of the TSW.P register is "ORed" by "or" logic 97 with the present content of the SW.P register to generate a new value for the P component of the Status Word. If the Vp bit is not set, the P component of the Status Word remains unaltered from the previous instruction. The valid bits $V_{CCC}$ and Vp act as enable signals for the corresponding Status Word registers allowing them to be updated when their respective valid bit is set. If the valid bit $V_{C1}$ is set, the the true input of 2:1 MUX 95 is selected and the content stored in the TSW.C1 register is copied directly into the SW.C1 register. If the valid bit $V_{C1}$ is not set, then the false input of MUX 95 is selected, and a "0" is written into the SW.C1 register. The Status Word register 42, in this manner, provides a programmer with the overall Status Word of the floating point unit and not just the status from the executed instruction.

THE EXCEPTION BITS AND STACK FLAG

Bits B0–B4 are provided to indicate when the floating point unit has detected an exception while executing an instruction. Bit $B_4$ (U) indicates if there is a stack underflow, Bit $B_3$ (0) indicates if there is a stack overflow, Bit $B_2$ (Z) indicates if there has been a division by 0, Bit $B_1$ (D) indicates if one of the instruction operands is denormalized; i.e,. has the smallest exponent but a non-zero significant, and Bit $B_0$ (I) indicates if an invalid operation has occurred. The stack flag bit $B_6$ (SF) is used to distinguish invalid operations due to stack overflow or underflow. When the SF bit is set, $B_9$ (C1) distinguishes between stack underflow (C1=0) and stack overflow (C1=1). Additional information regarding these exception bits of the x87 Status Word may be found in the handbook entitled *Microprocessors* published by Intel Corporation.

As shown in FIG. 6, the Temporary Status Word's exception bits and stack flag bit of an instruction are generated in the WF stage of the pipeline. These components of the Temporary Status Word are generated by generation logic 96 which receives an input from instruction boundary start logic 46. The exception bit and SF enable logic 76 determines if the SF, U, O, Z, D, & I components of the Temporary Status Word should be enabled so they can be updated.

Figure 8:
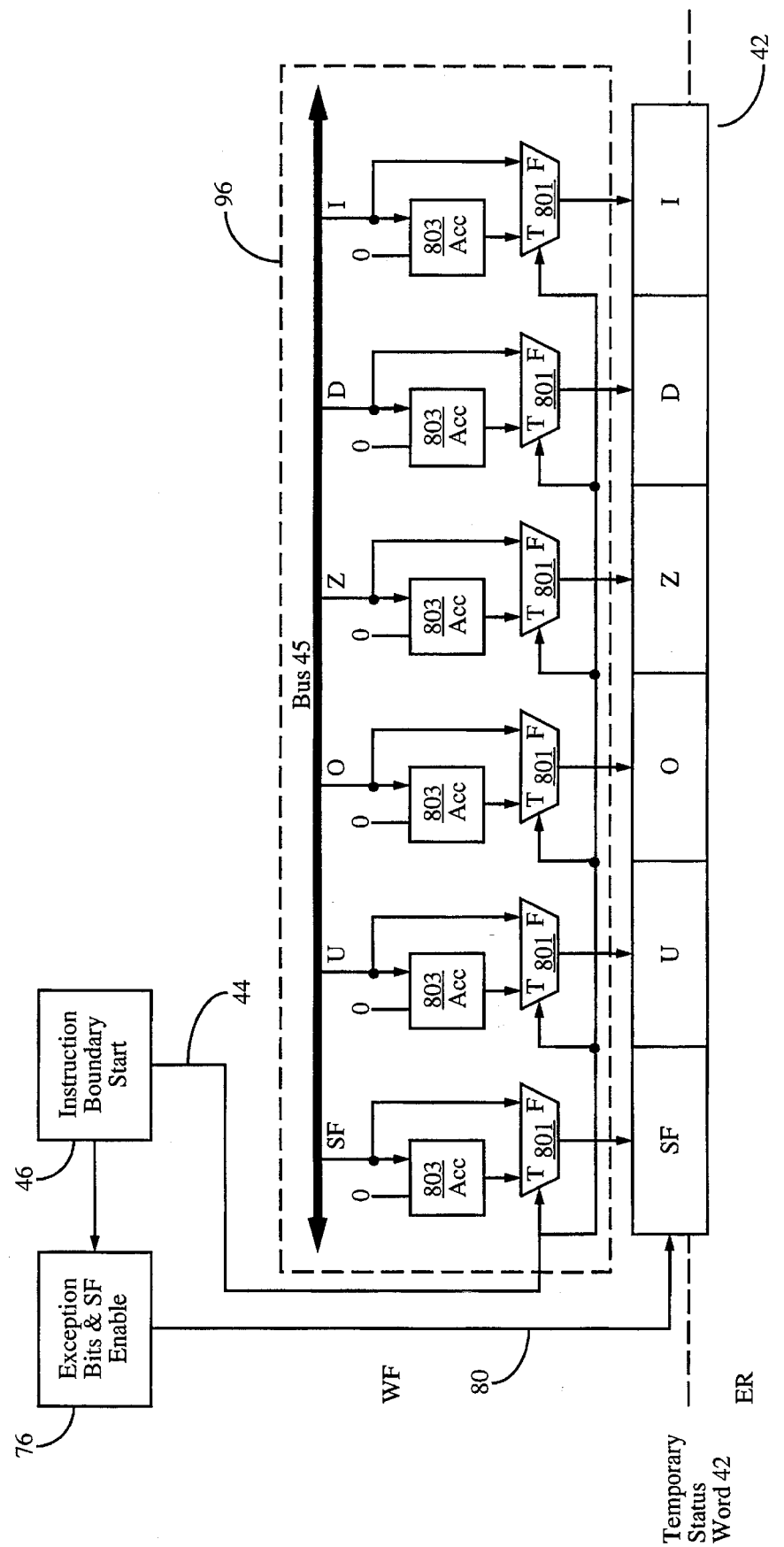
FIG. 8 shows an apparatus for generating the SF, U, Z, D, and I status bits of an instruction.

FIG. 8 shows generation logic 96 along with Temporary Status Word registers TSW.SF, TSW.U, TSW.O, TSW.Z, and TSW.D and TSW.I. These Temporary Status Word registers become enabled at the same time by enable single line 80 from exception bit and SF enable logic 76. The registers become enabled whenever they are to be updated with new data or to set to all zeros by a first microvector.

If the microvector which enters the WF stage is the first microvector of an instruction (i.e. the first microvector of a stream of microvectors or a single instruction microvector), instruction boundary start logic 46 provides a true signal on line 44. A true signal selects the true signal input for each of the 2:1 MUXs 801. The true inputs are supplied with data from accumulators 803 which have dual inputs, one coupled to a "zero" and one coupled to bus 45 which supplies new exception bits and status flags. The accumulator logic 803 overwrites the zero whenever data is supplied by bus 45. In this way, if a microvector is the first microvector of an instruction, exception bits and SF enable logic 76 enables the Temporary Status Word registers and then either all zero's are written into the registers or new values are supplied by bus 45 to the registers.

If the microvector is not the first microvector of an instruction then the false input of the 2:1 MUXs are selected by line 44. When the false input of MUX 801 is selected the bus 45 writes to the Temporary Status Word. In this way if the Temporary Status Word register has been enabled, all present components of the TSW are written over by bus 45.

In this way the exception bits and status flag of the Temporary Status Word are cleared at the beginning of each instruction. (I.e. they wake up cleared on the beginning of each floating point instruction) Starting with the first microvector of an instruction the Temporary Status Word may be updated by bus 45. Bus 45 updates all bits simultaneously. Subsequent microvectors of the same instruction write directly over the existing Temporary Status Word each time. There are no valid bits accompanying the TSW.SF, TSW.U, TSW.O, TSW.Z, TSW.D and TSW.I registers because their data can be treated as always being valid. At the completion of an instruction through the WF stage of the pipeline the TSW register contains the error status and stack flag of the processor due to the instruction only.

Because the Status Word provides the overall condition of the floating-point unit, the present error status due to the present instruction must be be merged with the already existing error status from previous instructions presently found in the Status Word register 40. The merge or rollover is accomplished in the ER stage of the execution pipeline. In the ER stage, instruction boundary end logic 50 checks a control field, BND 29 of microvector 22 via line 93 to determine whether the microvector is the last microvector representing an instruction. If the microvector is the last microvector of an instruction, then the contents of TSW register: TSW.SF, TSW.U, TSW.O, TSW.Z, TSW.D, and TSW.I are OR-ed with the contents stored in their respective Status Word components SW.SF, SW.U, SW.O, SW.Z, SW.D, and SW.I to generate a new Status Word. When the last microvector of an instruction enters the ER stage, the exception status due to the present instruction in combined with the existing exception status of previous instructions to generate the overall exception status of the floating point unit. Thus, components SF, U, O, Z, D and I of the Status Word found in Status Word register 40 provide the overall error status of the floating point unit and not just the status due to a single instruction only.

THE ES BIT AND B BIT

The ES bit ($B_7$) of the Status Word is the error summary status bit. The ES bit is set if any exception bit (P, U, 0, Z, D and I of the Status Word) is set and the corresponding exception is unmasked in the processor control word. The ES bit is cleared otherwise. The B Bit or busy bit ($B_{15}$) of the Status Word is included for the 8087 compatibility. The B Bit reflects the contents of the ES bit ($Bit_7$) of the Status Word. That is, the ES bit and B bit always have the same value. It is noted that the ES bit and B bit are generated in the ER stage. They are not produced from the TSW.E and TSW.B registers. They are generated by ES/B generation logic 82 which is coupled to the control word 48, to instruction boundary end logic 50, and, although not shown in FIG. 6 to TSW register 42 and SW register 40.

The error summary status bit ES and the busy bit B are only set if an exception flag is set and that particular exception is unmasked. To determine if an exception is masked or unmasked, one looks to the control word (CW) 48. Bits B0–B6 of the control word 48 indicate which exceptions are masked or unmasked. The control word allows a programmer to place different control words into the control word register to mask and unmask the various exceptions. The ES bit provides an accumulated status of the error status of the floating point unit. That is, if the present instruction provides no unmasked exceptions, but the previous instruction did, then the ES bit or error summary bit should remain set.

Figure 9:
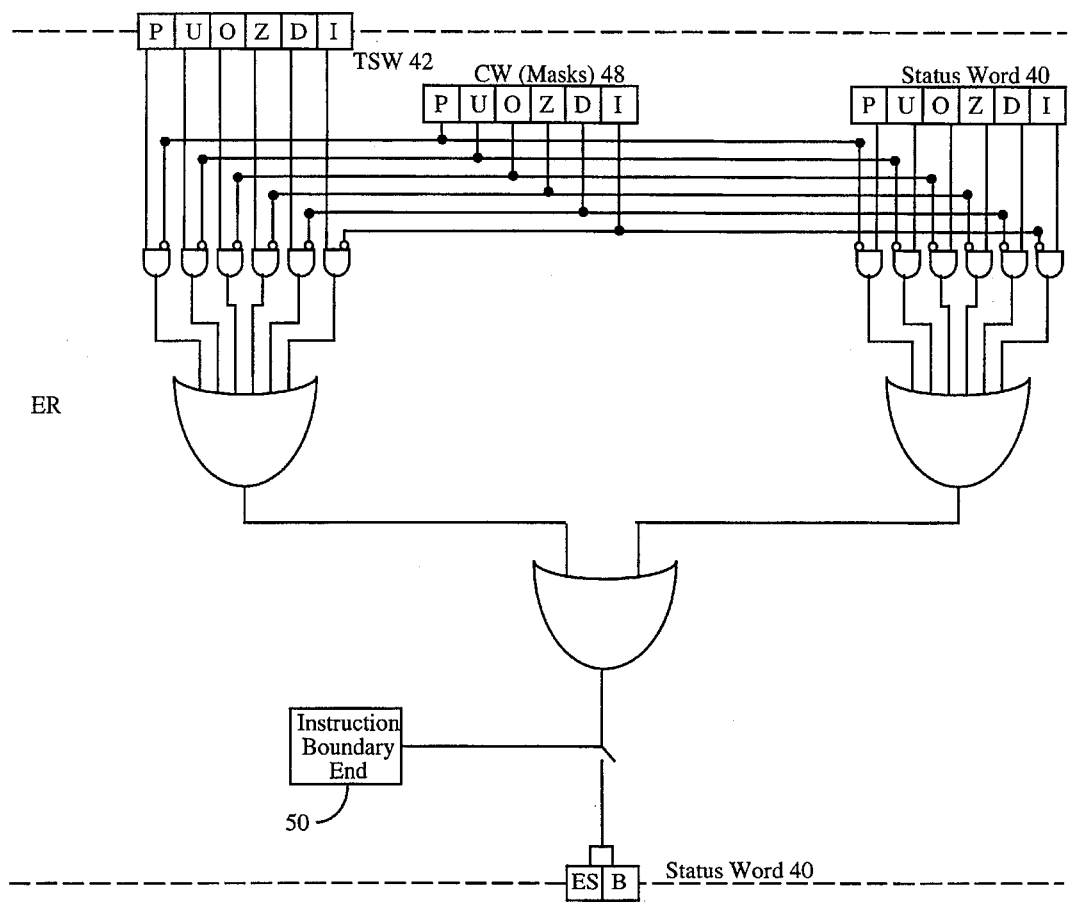
FIG. 9 shows an apparatus for generating the ES and B bits of the Status Word.

Therefore, as shown in FIG. 9, the "end boundary" condition is sensed by logic 50 in the ER stage which reads the control directives of microvector 22. If it is an "end boundary" condition, then the data from registers TSW.P, TSW.U, TSW.O, TSW.Z, TSW.D, and TSW.I is provided to logic in the ER stage. As shown if FIG. 9, the data from TSW.P, TSW.U, TSW.O, TSW.Z, TSW.D, and TSW.I registers are combined with the exception masks in the control word 48 to determine if any unmasked exception has occurred during execution of the present instruction. If an unmasked exception has occurred with respect to any of the exceptions, the ES bit and the B bit are each set. Additionally, as shown in FIG. 9, the logic in the ER stage combines the present exception bit components of the Status Word register 40 with their respective control word counterparts so that the ES bit and B bit will be set if a previous instruction had an error that was unmasked. In this way, the ES bit and B bit of the status word are recomputed each time an instruction completes execution. The ES bit and B bit of the Status Word provide an accumulative error status of the floating point unit and not just a status of a single instruction.

Thus, an apparatus and method has been described for updating on a per instruction basis a Status Word register of a processor having a pipelined micro-architecture. The Status Word register provides a user visible Status Word which describes the overall state of the processor. A Temporary Status Word register starts off cleared at the beginning of each instruction. The Temporary Status Word holds information corresponding to a single instruction. The Temporary Status Word accumulates status across several microvectors representing a single instruction. The components of the Temporary Status Word are updated under control of special microcontrol fields of the microvectors. Valid bits are provided with those components of the Temporary Status Word whose values are not always valid. At the completion of an instruction, the Temporary Status Word is merged with the Status Word, and not simply copied into the Status Word register, to generate a new Status Word which describes the overall state of the processor after completion of the instruction.

It is noted that although the present invention has been described in detail with respect to generating a Status Word in a pipelined processing unit of an x87 instruction set processor, the various teachings of the present invention can be applied to other instruction set processors with pipelined processing units.

Thus, by utilizing the method and apparatus of the present invention, one can consistently and accurately provide a programmer visible Status Word in a microprocessor which has a pipelined execution unit.

I claim:

1. A method of generating a plurality of condition code bits C1, C1, C2, and C3 and a precision bit P of a Status Word of an x87 instruction set compatible microprocessor having a pipelined floating point unit with a first stage and a last stage, said method comprising the steps of:

decoding an instruction into a stream of microvectors, wherein said stream of microvectors has a first microvector and a last microvector, said first and last microvectors defining boundaries of said instruction, wherein when said stream of microvectors is only a single microvector representing said instruction said single microvector is both a first and a last microvector, wherein said microvectors comprise a plurality of control fields which provide control directives to said pipelined floating point unit, wherein one of said control fields provides control directives indicating one of a plurality of predetermined update schemes of said condition code bits C0, C1, C2, C3 and said precision bit P by said microvector;

providing a Status Word (SW) storage means, said SW storage means having a storage means SW.P for the precision bit P of said x87 Status Word, and storage means SW.C0, SW.C1, SW.C2 and SW.C3 for each of the condition code bits C0, C1, C2, and C3, respectively, of said x87 Status Word;

providing a Temporary Status Word (TSW) storage means, said TSW storage means having a storage means TSW.P for said precision bit P, and storage means TSW.C0, TSW.C1, TSW.C2 and TSW.C3 for each of the condition code bits C0, C1, C2 and C3, respectively, said TSW storage means for storing and accumulating status information due to said microvectors of said instruction;

associating a valid bit Vp with said TSW. P storage means, associating a valid bit Vc1 with said TSW.C1 storage means, and associating a valid bit $V_{CCC}$ with the temporary storage means TSW.C0, and TSW.C2 storage means, wherein said valid bits indicate when said associated storage means contain valid data;

clearing said TSW.P, TSW.C0, TSW.C1, TSW.C2, and TSW.C3 storage means and said associative valid bits Vp, Vc1, and Vccc when said first microvector of said instruction enters a stage of the pipeline which contains said TSW.P, TSW.C0, TSW.C1, TSW.C2, and TSW.C3 storage means, and updating those components of said TSW storage means with new status data, specifically by said control field of said first microvector and setting valid bits for those components of said TSW storage means which have been updated;

updating for each microvector of said instruction a prespecified group of said TSW.P, TSW.C0, TSW.C1, TSW.C2, and TSW.C3 storage means, said prespecified group defined by a control directive of said control field of said microvector and setting said associated valid bits for said updated group of said TSW means; and generating, when said last microvector of said instruction reaches the last stage of the pipeline, new P, C0, C1, C2 & C3 bits of said Status Word wherein said C0, C1, C2 and C3 bits of said Status Word are the bits stored in said TSW.C0, TSW.C1, TSW.C2, and TSW.C3 storage means, respectively, when said associated valid bit is set, wherein the new C0, C2, and C3 bits of said Status Word are the bits presently stored in said SW.C0, SW.C2, and SW.C3 registers respectively when said $V_{CCC}$ bit is not set, wherein said new C1 bit of said Status Word is an "0" when said VC1 is not set, and wherein said P bit of said Status Word is an "OR" of the bit stored in said TSW.P storage means and the bit stored in said SW.P storage means if said Vp bit is set, and wherein said P bit of said x87 Status Word is the bit presently stored in said SW.P storage means if said Vp bit is not set.

2. The method of claim 1 wherein said control field is a dedicated control field for specifying a condition code and precision bit update scheme, said control field is a two bit field.

3. The method of claim 2 wherein one of said plurality of update schemes is an update of each of said condition code bits C0,C1; C2, C3 and an update of said precision bit P.

4. The method of claim 2 wherein one of said plurality of update schemes is an update wherein neither of said condition code bits C0, C1, C2, C3 nor said precision bit is updated.

5. The method of claim 2 wherein one of said plurality of update schemes is an update of said precision bit P, and a update of said condition code bit C1 only.

6. The method of claim 2 wherein one of said plurality of update schemes is an update of said condition code bits C0, C1, C2, and C3 only.

7. The method of claim 1, wherein the step of updating said TSW.C0, TSW.C1, TSW.C2, TSW.C3 and TSW.P storage means and setting of said valid bits $V_{C1}$, $V_P$, and $V_{CCC}$ occurs in the second to last stage of said pipelined floating point unit.

8. In a microprocessor capable of executing an x87 instruction set and having a pipelined floating point unit with a plurality of stages including a first stage and a last stage, a method of generating an x87 Status Word for an instruction as it completes the last stage of the execution pipeline, said method comprising the steps of:

decoding an instruction into a stream of microvectors or into a single microvector, wherein each of said microvectors comprises a plurality of control fields, wherein a first control field provides control directives for updating a TOS component of the Status Word, a second control field provides boundary information specifying first and last microvectors of said stream of microvectors representing said instruction, wherein if said instruction is decoded into a single microvector said second control field specifies both a first and last microvector, a third control field controls an updating of a plurality of condition code bits P, C1, C0, C2 and C3 of said Status Word and a fourth control field controls the updating of a plurality of components SF, U, 0, Z, D and I of said Status Word;

providing in the last stage of the pipeline storage means SW for storing the x87 Status Word representing overall status of the floating point unit due to a plurality of executed instructions, said SW storage means having storage means for each bit of the x87 Status Word, a SW.B storage means for storing a busy bit of the Status Word, storage means SW.C3, SW. C2, SW. C1, SW.C0, for storing the condition code bits C3, C2, C1 and C0, of the Status Word, respectively, a SW.ES storage means for storing an error summary bit of the Status Word, a SW.SF storage means for storing a stack flag bit of the Status Word, a SW.P storage means for storing a status precision bit of the Status Word, a SW.U storage means for storing an underflow exception bit of the Status Word, a SW.O storage means for storing an overflow exception bit of the Status Word, a SW.Z storage means for storing a zero divide bit of the Status Word, a SW.D storage means for storing a denormalized operand bit of the Status Word, a SW.I storage means for storing an invalid operation bit of the Status Word, a SW.TOS storage means for storing a top of stack pointer of said Status Word;

providing storage means (TSW) in in a stage prior to said last stage of said pipelined floating point unit said storage means for storing and accumulating status data of said individual microvectors of said instruction, wherein when said last microvector of said instruction is in the second to last stage of the pipeline said accumulated status data representing the status of the floating point unit due to said instruction alone, said TSW storage means having storage means TSW.C3, TSW.C2, TSW.C1, TSW.C0, for storing the condition code bits C3, C2, C1 and C0, respectively, representing the status of the floating point unit due to said instruction alone, a TSW.SF storage means for storing the stack flag bit representing the status of the floating point unit due to said instruction alone, a TSW.P storage means for storing the precision bit representing the status of the floating point unit due to said instruction alone, a TSW.U storage means for storing the underflow exception bit representing the status of the floating point unit due to said instruction alone, a TSW.0 storage means for storing the overflow bit representing the status of the floating point unit due to said instruction alone, a TSW.Z storage means for storing the zero divide bit representing the status of the floating point unit due to said instruction alone, a TSW.D storage means for storing the denormalized operand bit representing the status of the floating point unit due to said instruction alone, a TSW.I storage means for storing the invalid operation bit representing the status of the floating point unit due to said instruction alone, a TSW.TOS storage means for storing the present top of stack pointer due to said instruction;

associating a valid bit VP with said TSW.P storage means, associating a valid bit VC1 with said TSW.C1 storage means and associating a valid bit Vccc with the group of TSW.C0, TSW.C2 and TSW.C3 storage means wherein said valid bits indicate when said associative storage means contains valid data;

generating with each microvector of said instruction a TOS value, wherein said TOS value is generated from said first control field of said microvector, and staging down said TOS value, along with said microvector which generated said TOS value, to said TSW.TOS storage means;

clearing said TSW.B, TSW.C3, TSW.C2, TSW.C1, TSW.C0, TSW.ES, TSW.SF, TSW.P, TSW.U, TSW.O, TSW.Z, TSW.D and TSW.I storage means each time a first microvector enters the second to last stage of the pipeline;

updating with each microvector of said instruction a prespecified group of said TSW.C0, TSW.C1, TSW.C2, TSW.C3 and TSW.P storage means and setting said associated valid bits of those storage means which have been updated, said updated group specified by said third control field of said microvector;

updating with each microvector of said instruction said TSW.SF, TSW.U, TSW.0, TSW.Z, TSW.D and TSW.I storage means according to said fourth control field of said microvectors; and generating when said last microvector is in the last stage of the pipeline a new Status Word from said accumulated status stored in said TSW storage means and from the current Status Word presently stored in said SW storage means said new Status Word providing the overall status of the processor after execution of said instruction.

9. The method of claim 8 wherein the TOS component of the Status Word is generated by copying the value contained in said TSW.TOS storage means.

10. The method of claim 8, wherein SF, U, 0, Z, D, and I bits of said new Status Word are generated by "ORing" the values stored in TSW.SF, TSW.U, TSW.O, TSW.Z, TSW.D and TSW.I, storage means with the present Status Word stored in the SW.SF, SW.U, SW.O, SW.Z, SW.D and SW.I storage means, respectively.

11. The method of claim 8 wherein the condition code bits C0, C1, C2, C3 of said new Status Word are the bits contained in said TSW.C0, TSW.C1, TSW.C2, and TSW.C3 storage means which have their respective valid bits set, and the bits contained in the previous Status Word for those TSW.C0, TSW.C1, TSW.C2, and TSW.C3 storage means which do not have their associative valid bit set, respectively.

12. The method of claim 8, wherein the ES and B bits of said new Status Word are generated by a combining the bits contained in said TSW.P, TSW.U, TSW.O, TSW.Z, TSW.D and TSW.I with the bits contained in a control word, having storage means CW.P, CW.U, CW.O, CW.Z, CW.D and CW.I, respectively, to determine if an unmasked exception occurs, and by combining the bits stored in said SW.P, SW.N, SW.O, SW.Z, SW.D and SW.I with the bits contained in said CW.P, CW.N, CW.O, CW.Z, CW.D and CW.I storage means to determine if previously an exception has occured that was unmasked, wherein if an unmasked exception occurs or had occurred placing an "1" into said SW.ES and SW.B storage means, and otherwise placing an "0" into said SW.ES and SW.B storage means.

13. The method of claim 8 wherein said step of generating said TOS status from said first control field occurs in a pipeline stage one stage before a read operand stage.

14. The method of claim 8 wherein the P bit of said new Status Word is generated by "ORing" said present value stored in said SW.P storage means with said value stored in said TSW.P storage means when said Vp valid bit is set, and wherein said P bit of said new Status Word is the present value stored in said SW.P register when said Vp valid bit is not set.

15. In a microprocessor capable of executing an instruction set and having a pipelined execution unit with a plurality of stages including a first stage and a last stage, a method of generating new status data of the microprocessor on a per instruction basis, said method comprising the steps of:

decoding an instruction into a stream of microvectors, wherein said stream of microvectors has a first microvector which indicates a beginning of said instruction and a last microvector which indicates an end of said instruction, wherein when said stream of microvectors is only a single microvector representing said instruction said single microvector is both a first and a last microvector, said microvectors comprising a plurality of control fields which provide control directives to said execution unit;

providing storage means (SW) in the last stage of said execution pipeline, said SW storage means providing storage for each component of the status data, said SW storage means storing status data representing an overall status of the processor, said overall status data provided after execution of instructions through the pipelined execution unit;

providing storage means (TSW) in a stage prior to said last stage of said pipelined execution unit, said TSW storage means for storing and accumulating status data of said individual microvectors of said instruction, wherein when said last microvector of said instruction is in the second to last stage of the pipeline said accumulated status data represents the status of the processor due to said instruction alone, said TSW storage means having a plurality of storage means, one for each component of said status data, associating a valid bit with each component of said TSW storage means which may at times contain invalid data, said associated valid bit for indicating when said represented TSW storage means contains valid data;

clearing said TSW storage means and said valid bits when said first microvector enters the second to last stage of said pipeline and if specified by said first microvector updating those components of said TSW storage means with new status data specified by said control fields of said first microvector and setting said valid bits for those components of said TSW storage means which have been updated and which have valid bits;

updating, with each microvector of said instruction, components of said TSW storage means which are specified by said control directives of said microvectors of said instruction, and setting said valid bits for components of said TSW storage means which have been updated and which have associated valid bits; and generating new overall status data of said microprocessor when said last microvector of said instruction is in the last stage of the pipelined execution unit, said new overall status data generated from said accumulated status data contained in said TSW storage means and from the overall status data presently contained in said SW storage means.

16. In a processor having a pipelined execution unit, a method of generating status information about the processor on a per instruction basis, said method comprising the steps of:

providing an instruction for execution in said processor;

providing a first storage device, said first storage device storing a current status information wherein said current status information represents a status of said processor due to Complete execution of a plurality of instructions prior to complete execution of said instruction;

providing a second storage device, said second accumulating device storing instruction status information, said instruction status information representing a status of said processor due to execution of said instruction alone;

generating a new status information wherein said new status information represents a status of said processor after completion of the execution of said instruction, said new status information generated by merging said current status information of said processor stored in said first storage device with said instruction status information due solely to said executing instruction alone stored in said second storage device and storing said new status information in said first storage device.

17. An apparatus for generating status information about an overall status of a pipelined processor after an execution of an instruction through said pipelined processor, said apparatus comprising:

a first storage device, said first storage device for storing a current overall status, wherein said current overall status represents a status of said processor due to a complete execution of a plurality of instructions prior to complete execution said instruction; and a second storage device, said second accumulating device for storing an instruction status wherein said instruction status represents a status of said processor due to said execution of said instruction alone;

logic, wherein said logic generates said new overall status, wherein said new overall status represents a status of said processor due to said execution of said instruction and said execution of said plurality of instructions, said new overall status generated by merging said instruction status with said current overall status, and wherein said logic stores said new overall status in said first storage device.

18. A method of generating status information in a processor having a pipelined processing unit, said method comprising the steps of:

executing an instruction in said processor;

storing a current status information wherein said current status information represents a status of said processor due to complete execution of a plurality of instructions prior to complete execution of said instruction;

accumulating an instruction status information wherein said instruction status information represents a status of said processor due to execution of said instruction alone; and generating a new status information wherein said new status information represents a status of said processor after completion of the execution of said instruction and said plurality of instructions, and wherein said new status information is generated by merging said current status information with said instruction status information.

19. The method of claim 18 wherein said step of accumulating said instruction status information occurs in a pipeline stage prior to said step of generating said new status information.

20. The method of claim 18 further comprising the steps of:

generating a stream of microvectors comprising a plurality of microvectors having a first microvector and a last microvector wherein said stream of microvectors represents said instruction; and wherein said step of accumulating said instruction status information comprises the steps of:

providing a storage device; and accumulating in said storage device a status of said processor due to said plurality of microvectors.

* * * * *

UNITED STATES PATENT AND TRADEMARK OFFICE
CERTIFICATE OF CORRECTION

PATENT NO. : 5,590,359
DATED : December 31, 1996
INVENTOR(S) : Harshvardhan P. Sharangpani It is certified that error appears in the above-identified patent and that said Letters Patent is hereby corrected as shown below:

In column 20 at line 44 insert --storage device-- following "second" and prior to "accumulating"

In column 20 at line 45 delete "device storing"

In column 21 at line 1 delete "accumulating" and insert --storage--

In column 21 at line 2 delete "storing" and insert --accumulating--

Signed and Sealed this

Third Day of June, 1997

Attest:

BRUCE LEHMAN

Attesting Officer

Commissioner of Patents and Trademarks